May 28, 1968 J. SEYMORE 3,385,043
ROTARY MOWER
Filed Feb. 19, 1965
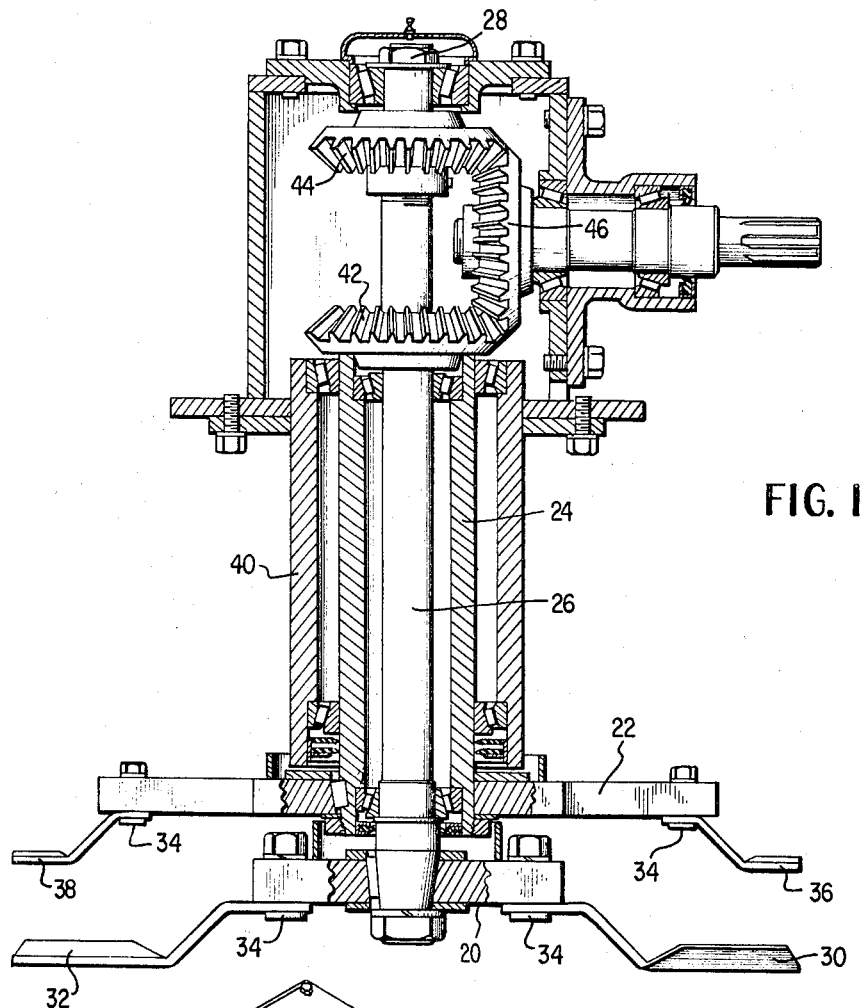
FIG. 1
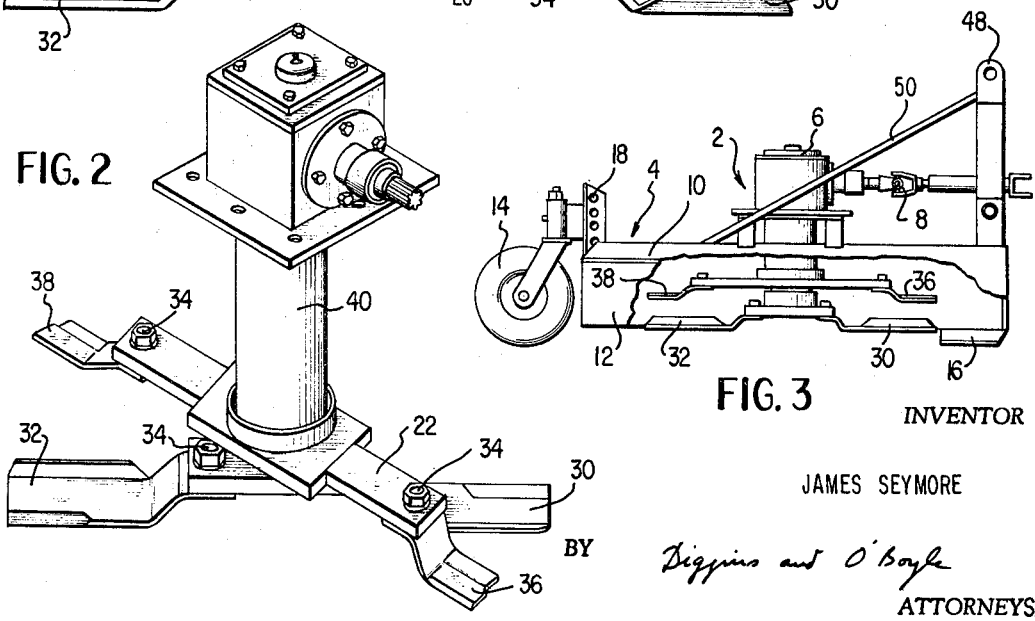
FIG. 2
FIG. 3
INVENTOR
JAMES SEYMORE
BY Diggins and O'Boyle
ATTORNEYS.

3,385,043
ROTARY MOWER

James Seymore, Selma, Ala., assignor to Bush Hog, Inc., Selma, Ala., a corporation of Delaware
Filed Feb. 19, 1965, Ser. No. 433,988
6 Claims. (Cl. 56—503)

ABSTRACT OF THE DISCLOSURE

The cutting and shredding machine comprising the instant invention is equipped with means to provide double shredding of vegetable matter, including double counter rotating blades that are housed in a suitable enclosure, being equipped with pivotally mounted, shaped blades to increase the suction and to thereby increase the shredding action on the vegetable matter.

---

This invention relates to a cutting and shredding machine, and more particularly relates to a machine for cutting vegetable stubs and the like and subjecting them to a double shredding action, as is more particularly described hereinafter.

While the present invention is not necessarily confined to such a use, it is particularly adapted to the shredding of all kinds of stalks remaining after harvest of various farm crops such as cotton, corn, cane, etc. It is very efficient in cleaning up land infested with heavy growths of weeds, briars and even bushes or small trees that have a growth of trunk or stalk up to as much as three inches in diameter. The cutting machine cuts all weeds, vines, stalks, etc. and subjects them to a double shredding action before they pass out of and behind the machine.

In a prior Patent No. 2,634,571, issued April 14, 1953, a cutting and shredding machine consisting of rotatable, hinged blades confining the cutter housing was disclosed. The cutting blades were partially enclosed on three sides and the top, whereby the ground formed the bottom of the closure and vegetation was subjected to the action of the cutting blades until it was shredded or cut into pieces small enough to pass out of the closure through the space between the housing and the ground. The blades of this machine were pivotally mounted on bars which were fixed or attached in fixed relationship to a single vertical rotating shaft so that the blades were radially extended by centrifugal force during normal operation but could fail back and pass rocks, stumps, etc. which were too hard or too large for cutting.

While this cutting and shredding device proved to be generally satisfactory in operation it was found that double shredding of vegetable matter would promote more rapid decomposition, boll weevils, corn borers and other insects would be destroyed and the more finely shredded material would spread more evenly thus preventing windrowing of material.

Accordingly, it is a primary object of the present invention to provide an improved cutting and shredding device having rotating pivotally mounted blades which are so arranged as to provide double shredding of the vegetable matter.

It is another object of the invention to provide such an improved cutting and shredding machine having double counter rotating blades.

It is another object of the invention to provide such an improved cutting and shredding machine having rotating pivotally mounted blades wherein one pair of said blades are mounted on a bar attached in fixed relationship to a vertical shaft rotating in one direction and another pair of said blades are mounted on a bar attached in fixed relationship to a vertical shaft rotating in the opposite direction.

FIGURE 1 is a sectional view of the apparatus embodying the present invention indicating an arrangement of shafts gearing the blades.

FIGURE 2 is a perspective view of a section of the present invention indicating the exterior of the gear box housing the blade attachment.

FIGURE 3 is a partly broken away side elevation of the cutting and shredding machine embodying the invention.

Referring more particularly to the figures of the drawings there is shown in FIGURE 3 a cutting and shredding machine 2 comprised of frame member 4 which supports a gear box 6 driven by a drive shaft (not shown) connected to universal joint 8. The frame 4 carries a top cover 10 to which is attached a depending flange 12. The machine rides on a caster type wheel 14 attached at the rear of the frame and upon skids 16 which may be attached to the lower edge of the flange on each side of the machine to insure freedom of movement over uneven ground and to prevent the leading edge of the flange from digging into the ground. Normally the skids need not touch the ground when the machine is being used on level ground.

Wheel 14 is positioned such that the lower edge of the cutter housing rides above the ground, thus allowing the shredded vegetation to pass out under the machine. The wheel is adjustably mounted so that the bracket carrying the wheel may be bolted in various vertically spaced positions at the rear of frame 4 by means of bolts 18. Thus the housing can be made to ride at any predetermined distance from the ground thus regulating the size of the space between the ground and the housing walls, through which space the shredded material passes as the machine moves forward.

The cutting mechanism of the invention includes two blade holders 20 and 22 spaced vertically apart approximately three to four inches. Blade holder 22 is rigidly connected to a vertical tubular shaft 24, said shaft extending through the top cover 10 into the gear box 6 mounted on the upper side of the top cover. Blade holder 20 is rigidly connected to a vertical shaft 26 which turnably projects through the shaft 24 to a termination above the frame where it is engaged by an axially adjustable thrust collar 28 supported by the top of said gear box. The blades 30 and 32 are pivotally connected at each end of blade holder 20 by means of bolts 34 in such a manner as to enable the bladed end to swing freely in an arc about said bolts. Such an arrangement permits the blades to become extended upon the application of centrifugal force through the turning of the vertical shaft, while at the same time permitting the blades to assume a folded position should they strike an obstruction while in operation, thus preventing damage and consequent expense of replacement.

Two blades 36 and 38 are pivotally connected at each end of blade holder 22 in the same manner as blades 30 and 32 are connected to blade holder 20.

The tubular shaft 24 rotates within a bearing sleeve 40 which forms part of the gear box housing. A bevel pinion 42 is welded to the shaft 24 in the lower portion of the gear box housing. The shaft 24 terminates at the bottom of bevel pinion 42 so as to leave a portion of the shaft 26 exposed. A bevel pinion 44 is splined on said exposed portion of the shaft 26 in inverted relation to the pinion 42. The pinions are both engaged by a bevel gear 46 driven through the universal joint 18 by the drive shaft.

By driving the universal joint to bevel gear 46 in a counter clockwise direction as shown in FIGURE 2, blade holding bar 22 and the blades pivotally mounted thereon are rotated in a counter clockwise direction and blade holding bar 20 and the blades pivotally mounted thereon are rotated in a clockwise direction.

Blades 30 and 32 are fan shaped providing uplift to pick vegetation up to cut and move it upward to blades 36 and 38. Blades 36 and 38 are also fan shaped providing added suction and turbulence to increase the shredding action.

A suitable means for drawing the machine is provided, such as the draw bar assembly 48 suitably braced at 50, although it is to be understood that other suitable means for propelling the cutter may be employed if desired.

It will be apparent from the foregoing that we have disclosed an improved form of cutting and shredding machine utilizing a cutter assembly which not only permits the machine to strike stumps and other solid obstructions without doing damage to the cutting blades but provides double counter rotating blades for double shredding. The invention may be embodied in other specific forms without departing from the spirit or essential characteristics thereof. The present embodiment is therefore to be considered in all respects illustrative and not restrictive, the scope of the invention being indicated by the appended claims rather than by the foregoing description, and all changes which come within the meaning and range of equivalency of the claims are therefore intended to be embraced therein.

What is claimed and desired to be securd by United States Letters Patent is:

1. A mechanism for cutting and shredding vegetable matter comprising a cutter flange having an arcuate rearward portion and straight side portions extending forwardly therefrom substantially tangent to said arcuate rearward portion, a substantially horizontal top cover plate secured to the upper edge of said flange to form a rearwardly closed forwardly open enclosure therewith, means supporting said flange a predetermined distance above the ground, a tubular shaft mounted in said top cover for rotation about an axis normal to the plane of said top cover plate, a second shaft which projects through said tubular shaft mounted in said top cover for rotation about an axis normal to the plane of said top cover plate, said second shaft terminating in its lower end above the bottom edge of said flange, the lower end of said tubular shaft terminating at a point above the termination of the lower end of said second shaft, blade holding means rigidly secured to said second shaft adjacent the lower end thereof, a second blade holding means parallel to said first mentioned blade holding means rigidly secured to said tubular shaft adjacent the lower end thereof, a cutting blade pivotally mounted at each end of each of said blade holding means, the free ends of said blades being received within said enclosure, and means for rotating said tubular shaft and said second shaft in opposite directions whereby matter initially cut by said blades pivotally mounted on said blade holding means on said second shaft is moved upward to be cut by said blades pivotally mounted on said blade holding means on said tubular shaft, said matter being retained within said enclosure and shredded by the cutting blades until it is of sufficiently small size to pass below the lower edge of said flange.

2. The cutter mechanism according to claim 1 wherein said blade holding means are spaced three to four inches apart.

3. The cutter mechanism as defined in claim 2 wherein said blades are fan shaped providing suction and turbulence for increasing the shredding action.

4. The cutter mechanism as defined in claim 3 wherein said means for rotating said tubular shaft and said second shaft in opposite directions include a first bevel pinion splined on said tubular shaft, a second bevel pinion splined on said second shaft in inverted relation to said first bevel pinion and a bevel gear driven through a universal joint for engaging said first and second pinions.

5. The cutter mechanism according to claim 4 wherein said means for supporting said housing a predetermined distance above the ground comprises a caster wheel adjustably secured to the rear of said cutter and skids secured to and extending downwardly from the forward edge of said forwardly extending portions of said flange.

6. A mechanism for cutting and shredding vegetable matter comprising a cutter flange having an arcuate rearward portion and straight side portions extending forwardly therefrom substantially tangent to said arcuate rearward portion, a substantially horizontal top cover plate secured to the upper edge of said flange to form a rearwardly closed forwardly open enclosure therewith, means supporting said flange a predetermined distance above the ground, a tubular shaft mounted in said top cover for rotation about an axis normal to the plane of said top cover plate, a second shaft which projects through said tubular shaft mounted in said top cover for rotation about an axis normal to the plane of said top cover plate, said second shaft terminating in its lower end above the bottom edge of said flange, the lower end of said tubular shaft terminating at a point above the termination of the lower end of said second shaft, blade holding means rigidly secured to said second shaft adjacent the lower end thereof, a second blade holding means parallel to said first mentioned blade holding means rigidly secured to said tubular shaft adjacent the lower end thereof, a cutting blade mounted at each end of each of said blade holding means, the free ends of said blades being received within said flange, and means for rotating said tubular shaft and said second shaft in opposite directions whereby matter initially cut by said blades pivotally mounted on said blade holding means on said second shaft is moved upward to be cut by said blades pivotally mounted on said blade holding means on said tubular shaft, said matter being retained within said enclosure and shredded by the cutting blades until it is of sufficiently small size to pass beneath the lower edge of said flange.

References Cited

UNITED STATES PATENTS

| | | | |
|---|---|---|---|
| 1,059,404 | 4/1913 | Spira | 56—500 |
| 1,472,587 | 10/1923 | Crowder | 56—255 |
| 2,649,678 | 8/1953 | Sishe | 56—25.4 |
| 2,701,942 | 2/1955 | Caldwell et al. | 56—503 X |
| 2,753,674 | 7/1956 | Cunningham et al. | 56—6 |

ANTONIO F. GUIDA, *Primary Examiner.*

ABRAHAM G. STONE, RUSSELL R. KINSEY,
*Examiners.*